US012759464B2

(12) United States Patent
Lindenthal et al.

(10) Patent No.: US 12,759,464 B2
(45) Date of Patent: Oct. 13, 2026

(54) AUTOMATED VEHICLE CAMERA SYSTEMS FOR VEHICLE TRAILERS

(71) Applicant: GM GLOBAL TECHNOLOGY OPERATIONS LLC, Detroit, MI (US)

(72) Inventors: Steffen Peter Lindenthal, Oshawa (CA); Yun Qian Miao, Waterloo (CA); Behnaz Ahmadi, Waterloo (CA); Utkarsh Saini, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/012,298

(22) Filed: Jan. 7, 2025

(65) Prior Publication Data

US 2026/0192751 A1 Jul. 9, 2026

(51) Int. Cl.
*B60R 1/26* (2022.01)
*B60R 1/25* (2022.01)

(52) U.S. Cl.
CPC .................. *B60R 1/26* (2022.01); *B60R 1/25* (2022.01); *B60R 2300/105* (2013.01); *B60R 2300/307* (2013.01); *B60R 2300/402* (2013.01); *B60R 2300/607* (2013.01); *B60R 2300/808* (2013.01)

(58) Field of Classification Search
CPC ....... B60R 1/26; B60R 1/25; B60R 2300/105; B60R 2300/307; B60R 2300/402; B60R 2300/607; B60R 2300/808
See application file for complete search history.

(56) References Cited

U.S. PATENT DOCUMENTS

| | | | | |
|---|---|---|---|---|
| 2019/0118860 A1* | 4/2019 | Gali | ........................ | G06V 20/20 |
| 2021/0232142 A1* | 7/2021 | Mepham | ................. | B60R 11/04 |
| 2026/0021846 A1* | 1/2026 | Alamir Tamer | ....... | B62D 13/06 |

FOREIGN PATENT DOCUMENTS

| | | |
|---|---|---|
| DE | 102018221863 A1 | 6/2020 |
| DE | 102020129455 A1 | 5/2022 |

OTHER PUBLICATIONS

German Office Action from counterpart DE1020251063400, dated Aug. 22, 2025.

* cited by examiner

*Primary Examiner* — Michael Lee

(57) ABSTRACT

An example vehicle camera system for a vehicle trailer includes a trailer hitch configured to couple with a trailer, a rear vehicle camera and a side vehicle camera each configured to capture images of the trailer, and a vehicle control module configured to capture a rearview image and a sideview image of the trailer, obtain stored camera dimensions of the vehicle indicative of locations of the rear vehicle camera and side vehicle camera, determine a hitch articulation angle of the trailer hitch according to the rearview image, identify a front corner location of the trailer according to the rearview image and the sideview image, calculate a width of the trailer according to the front corner location, the hitch articulation angle, and the stored camera dimensions, and store the width of the trailer in memory for automated control of the vehicle while the trailer is attached to the trailer hitch.

20 Claims, 7 Drawing Sheets

AUTOMATED VEHICLE CAMERA SYSTEMS FOR VEHICLE TRAILERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to automated vehicle camera systems for vehicle trailers, including determination of trailer dimensions using vehicle rear and side cameras and trailer hitch articulation angles.

Estimating width and height of a vehicle trailer using sensors is a difficult challenge. Some approaches attempt to use ultrasound to determine a width of a trailer, but ultrasound is very difficult due to trailer tongues having complex triangular shapes.

SUMMARY

An example vehicle camera system for a vehicle trailer includes a trailer hitch configured to couple with a trailer for towing the trailer behind a vehicle, a rear vehicle camera configured to capture images of the trailer from a rear of the vehicle, a side vehicle camera configured to capture images of the trailer from a side of the vehicle, and a vehicle control module configured to capture a rearview image of the trailer from the rear vehicle camera, capture a sideview image of the trailer from the side vehicle camera, obtain stored camera dimensions of the vehicle indicative of a location of the rear vehicle camera relative to a location of the side vehicle camera, determine a hitch articulation angle of the trailer hitch according to the rearview image captured by the rear vehicle camera, identify a front corner location of the trailer according to the rearview image and the sideview image, calculate a width of the trailer according to the front corner location, the hitch articulation angle, and the stored camera dimensions, and store the width of the trailer in memory for automated control of the vehicle while the trailer is attached to the trailer hitch.

In some examples, the vehicle control module is configured to control automated steering of the vehicle, automated acceleration of the vehicle, and automated braking of the vehicle, according to the width of the trailer stored in memory.

In some examples, the vehicle control module is configured to modify automated trailer reversing control of the vehicle according to the width of the trailer stored in memory.

In some examples, the vehicle control module is configured to identify a rear corner location of the trailer according to the sideview image captured by the side vehicle camera, calculate a length of the trailer according to the rear corner location, the front corner location, the hitch articulation angle and the stored camera dimensions, and store the length of the trailer in memory for automated control of the vehicle while the trailer is attached to the trailer hitch.

In some examples, the vehicle control module is configured to identify a top corner location of the trailer according to the sideview image captured by the side vehicle camera, calculate a height of the trailer according to the top corner location, the front corner location, the hitch articulation angle and the stored camera dimensions, and store the height of the trailer in memory for automated control of the vehicle while the trailer is attached to the trailer hitch.

In some examples, the vehicle control module is configured to determine whether the trailer has a rectangular profile according to at least one of the sideview image and the rearview image, calculate the height of the trailer in response to determining that the trailer has the rectangular profile, and generate a notification of ineligible height calculation in response to determining that the trailer does not have the rectangular profile.

In some examples, the vehicle control module is configured to identify a wheel location of the trailer according to the sideview image captured by the side vehicle camera, calculate an axle length of the trailer according to the wheel location, the front corner location, the hitch articulation angle and the stored camera dimensions, and store the axle length of the trailer in memory for automated control of the vehicle while the trailer is attached to the trailer hitch.

In some examples, the vehicle control module is configured to determine whether a wheel of the trailer is visible in the sideview image, calculate the axle length of the trailer only in response to determining that the wheel is visible in the sideview image, and generate a notification of ineligible axle length calculation in response to determining that the wheel is not visible in the sideview image.

In some examples, the stored camera dimensions include a computer-aided design (CAD) model of the vehicle including locations of the rear vehicle camera and the side vehicle camera.

In some examples, the vehicle control module is configured to obtain a specified articulation angle threshold, calculate the width of the trailer only in response to the hitch articulation angle of the trailer being greater than the specified articulation angle threshold, and generate a notification of ineligible width calculation in response to the hitch articulation angle of the trailer being less than the specified articulation angle threshold.

In some examples, the specified articulation angle threshold is a calibratable threshold of at least thirty degrees.

In some examples, the vehicle control module is configured to calculate the width of the trailer without using any sensed ultrasonic data indicative of a location of the trailer.

An example method of operating a vehicle camera system for a vehicle trailer, capturing a rearview image of a trailer from a rear vehicle camera, the trailer coupled with a trailer hitch of a vehicle, capturing a sideview image of the trailer from a side vehicle camera, obtaining stored camera dimensions of the vehicle indicative of a location of the rear vehicle camera relative to a location of the side vehicle camera, determining a hitch articulation angle of the trailer hitch according to the rearview image captured by the rear vehicle camera, identifying a front corner location of the trailer according to the rearview image and the sideview image, calculating a width of the trailer according to the front corner location, the hitch articulation angle, and the stored camera dimensions, and storing the width of the trailer in memory for automated control of the vehicle while the trailer is attached to the trailer hitch.

In some examples, the method includes controlling automated steering of the vehicle, automated acceleration of the vehicle, and automated braking of the vehicle, according to the width of the trailer stored in memory.

In some examples, the method includes modifying automated trailer reversing control of the vehicle according to the width of the trailer stored in memory.

In some examples, the method includes identifying a rear corner location of the trailer according to the sideview image captured by the side vehicle camera, calculating a length of the trailer according to the rear corner location, the front corner location, the hitch articulation angle and the stored camera dimensions, and storing the length of the trailer in memory for automated control of the vehicle while the trailer is attached to the trailer hitch.

In some examples, the method includes identifying a top corner location of the trailer according to the sideview image captured by the side vehicle camera, calculating a height of the trailer according to the top corner location, the front corner location, the hitch articulation angle and the stored camera dimensions, and storing the height of the trailer in memory for automated control of the vehicle while the trailer is attached to the trailer hitch.

In some examples, the method includes determining whether the trailer has a rectangular profile according to at least one of the sideview image and the rearview image, calculating the height of the trailer only in response to determining that the trailer has the rectangular profile, and generating a notification of ineligible height calculation in response to determining that the trailer does not have the rectangular profile.

In some examples, the method includes identifying a wheel location of the trailer according to the sideview image captured by the side vehicle camera, calculating an axle length of the trailer according to the wheel location, the front corner location, the hitch articulation angle and the stored camera dimensions, and storing the axle length of the trailer in memory for automated control of the vehicle while the trailer is attached to the trailer hitch.

An example method of operating a vehicle camera system for a vehicle trailer includes capturing a rearview image of a trailer from a rear vehicle camera, the trailer coupled with a trailer hitch of a vehicle, capturing a sideview image of the trailer from a side vehicle camera, obtaining stored camera dimensions of the vehicle indicative of a location of the rear vehicle camera relative to a location of the side vehicle camera, determining a hitch articulation angle of the trailer hitch according to a hitch articulation sensor rearview image captured by the rear vehicle camera, identifying a front corner location of the trailer according to the rearview image and the sideview image, identifying a rear corner location of the trailer according to the sideview image, calculating a length of the trailer according to the front corner location, the rear corner location, the hitch articulation angle, and the stored camera dimensions, and storing the length of the trailer in memory for automated control of the vehicle while the trailer is attached to the trailer hitch.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Some example embodiments herein include vehicle camera systems configured to automatically determine a vehicle trailer's length, width, and height (e.g., for rectangular box trailers) using vehicle camera angular observations (3 from sideview and 1 from RVC), combined with known dimensions of the vehicle camera locations relative to one another, and a sensed hitch articulation angle. For example, three images of the trailer captured by a side vehicle camera, and an image of the trailer captured by a rear vehicle camera, may be used to determine trailer dimensions.

The locations of the rear camera and side camera on the vehicle relative to one another may be obtained from vehicle models, such as a vehicle computer-aided design (CAD) model which indicates locations of cameras on the vehicle. Additionally, the trailer axle length may be determined from the sideview camera observation if wheel(s) of the trailer are visible. The hitch articulation angle may be determined based on an image of the trailer hitch and/or the trailer captured by the rear view camera, or a dedicated hitch articulation angle sensor mounted on, in or adjacent the trailer hitch.

In some examples, a vehicle control module may estimate width of a trailer with distinct front corners using one exposure of a side view camera, and a rearview camera, combined with a vehicle CAD model and vehicle hitch articulation angle measurement. The vehicle control module may be configured to estimate a trailer length from a vehicle stereo view in one exposure (e.g., from linear and point-form features).

In some examples, the vehicle control module may be configured to estimate a trailer height from the vehicle stereo view in one exposure (e.g., linear and point-form features that are visible both in the outside and rearview cameras). The vehicle control module may be configured to estimate a trailer wheelbase from the vehicle sideview camera, using an estimated front trailer corner, an assumed constant lateral wheel-offset and one or more sets of multiple image sets of the trailer.

Example embodiments may provide one or more benefits or advantages, such as automatic and accurate estimation of trailer dimensions using surround view images from rear vehicle and side vehicle cameras only, without the need for complex analysis of ultrasound observations. In some cases, one set of image frames from the rear and side cameras may be sufficient to calculate the trailer dimensions.

Figure 1:
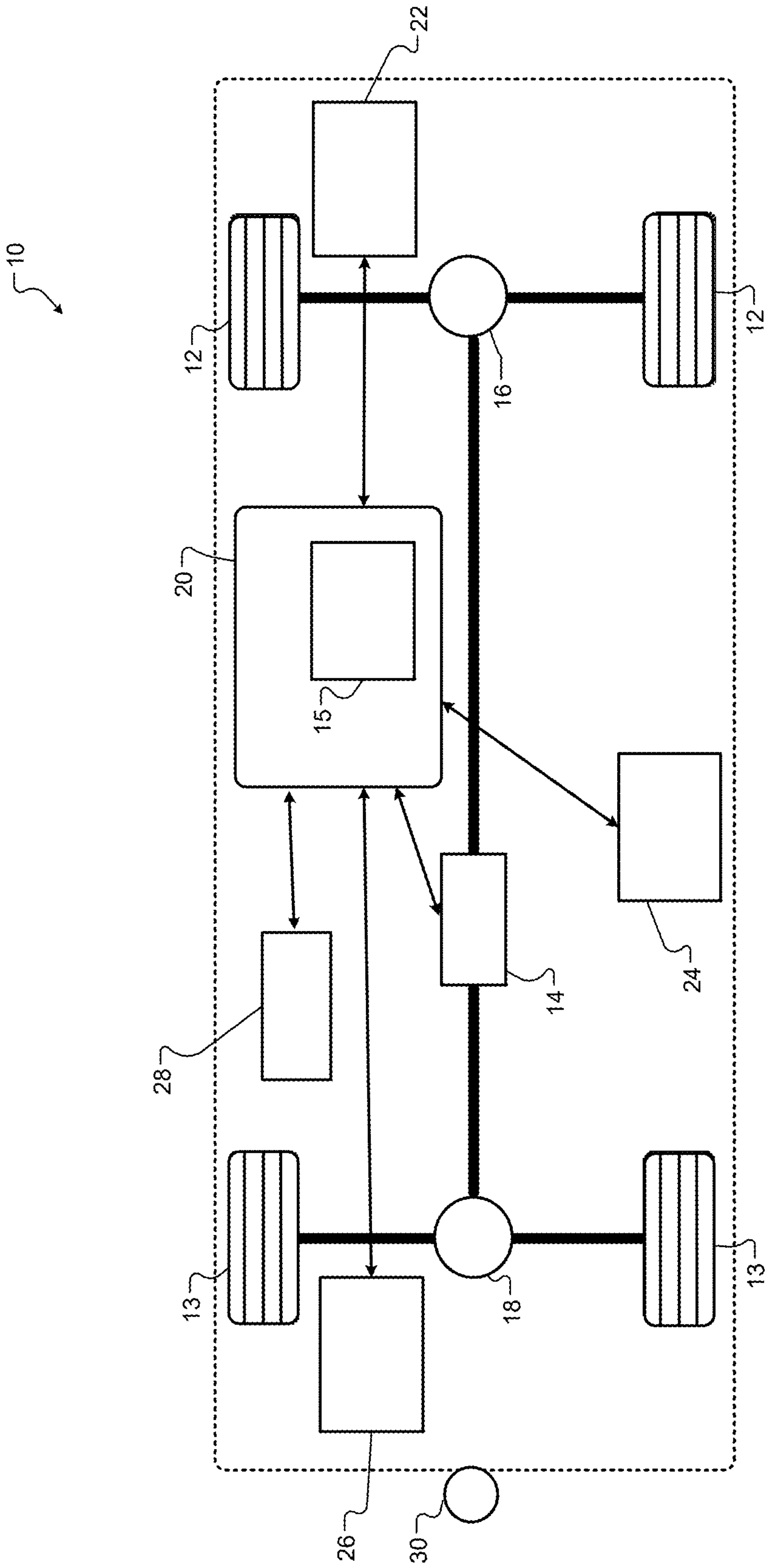
FIG. 1 is a diagram of an example automated vehicle camera system for vehicle trailers.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc.

In the example of FIG. 1, the vehicle 10 includes a front vehicle camera 22, a side vehicle camera 24, and a rear vehicle camera 26. Each camera may include any suitable camera hardware components, image processing capabilities, etc., to capture images of surroundings of the vehicle, such as a trailer connected to a trailer hitch 30 of the vehicle, road features, other vehicles, etc. In some examples, images from vehicle cameras may be used for determining dimensions of a towed trailer (such as trailer width, length, height and axle length), object detection, automated driving, etc. Other example embodiments may include more or less cameras, or cameras at other positions on the vehicle 10. Other systems such as Lidar may be used to determine images or information about the surrounding environment of the vehicle.

The vehicle control module 20 may communicate with another device via a wireless communication interface 28, which may include one or more wireless antennas for transmitting and/or receiving wireless communication signals. For example, the wireless communication interface 28 may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface 28 may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

As shown in FIG. 1, the vehicle control module 20 may store vehicle dimension data 15, such as computer-aided design (CAD) data which identifies locations of the side vehicle camera 24 and the rear vehicle camera 26 on the vehicle 10, relative to one another, relative to a location of the trailer hitch 30, etc.

Figure 2:
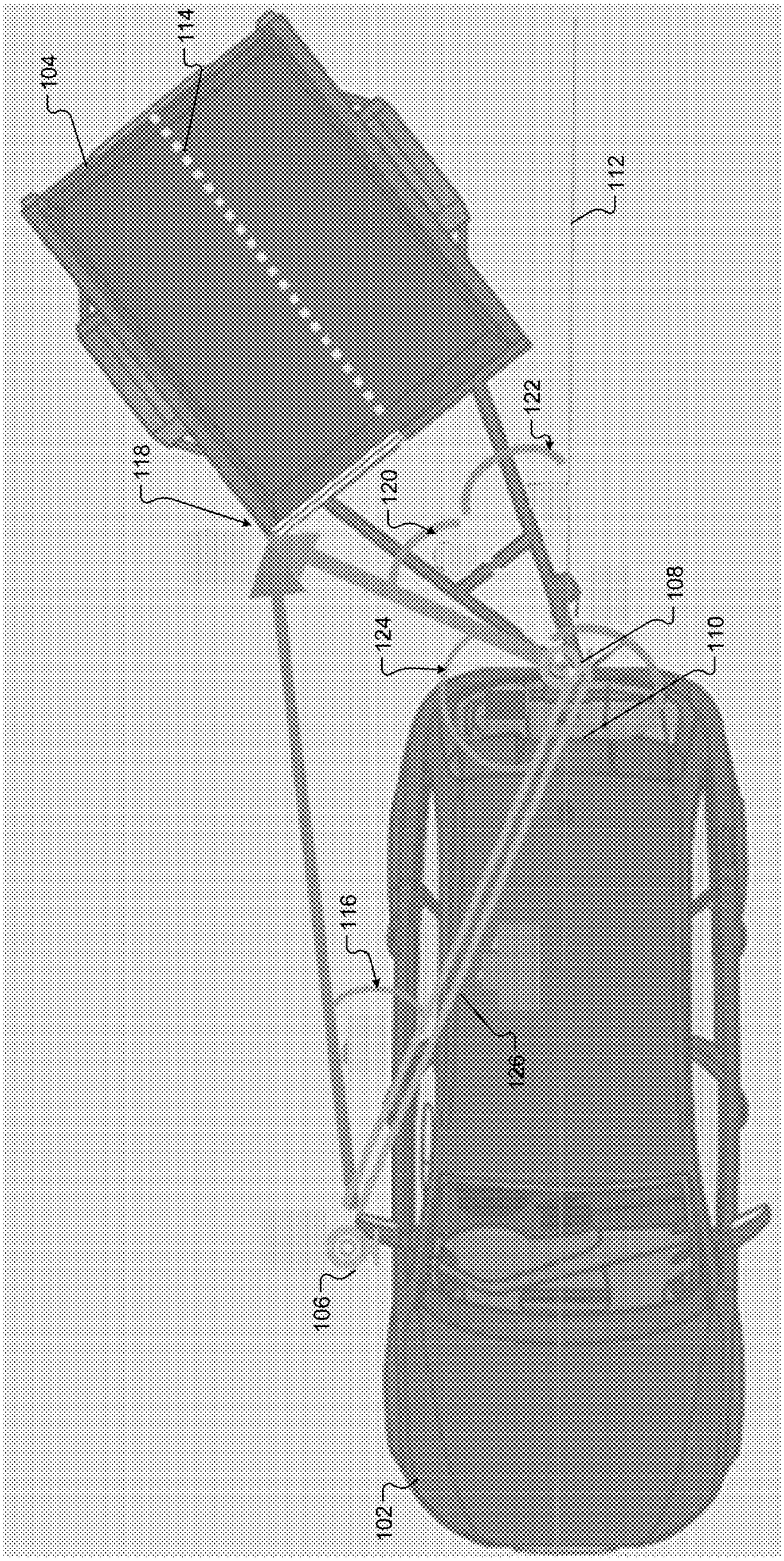
FIG. 2 is an example overhead view of the automated vehicle camera system of FIG. 1 configured to determine a front corner location of the trailer.

FIG. 2 is an example overhead view of the automated vehicle camera system of FIG. 1 configured to determine a front corner location of the trailer. As shown in FIG. 2, the vehicle 102 is towing a trailer 104, which is coupled to a trailer hitch 108.

The vehicle 102 includes a side vehicle camera 106, and a rear vehicle camera 110. The side vehicle camera 106 and rear vehicle camera 110 may be located at any suitable positions on the vehicle, such as a side view mirror, a side panel, a rear vehicle door, a rear vehicle panel, a center top location at a rear of the vehicle, an offset rear camera, etc.

The locations of the side vehicle camera 106 and the location of the rear vehicle camera 110 on the vehicle, and relative to one another, may be stored in memory of a vehicle control module. For example, a computer-aided design (CAD) model of the vehicle (or other dimensions) may be stored, indicating a distance 126 between the side vehicle camera 106 and the rear vehicle camera 110 and/or the trailer hitch 108.

The rear vehicle camera 110 and/or side vehicle camera 106 may be configured to determine a location of a front corner 118 of the trailer 104, such as by processing images of the trailer 104 as captured by the rear vehicle camera 110 to identify an edge of the trailer 104 in the image. For example, a forward ray intersection may be calculated based on the distance 126 between the side vehicle camera 106 and the rear vehicle camera 110, the angle 116 between the front corner 118 and trailer hitch 108 from the perspective of side vehicle camera 106, and the angle 124 between the front corner 118 and the side vehicle camera 106 from the perspective of the trailer hitch 108.

The vehicle control module may determine a hitch articulation angle 122, between a vehicle centerline 112, and a trailer centerline 114. The hitch articulation angle 122 may be determined by performing image processing on an image of the trailer 104 and/or trailer hitch 108 as captured by the rear vehicle camera 110. The vehicle control module may determine an angle 120 between the trailer centerline 114 and the front corner 118 of the trailer 104.

Figure 3:
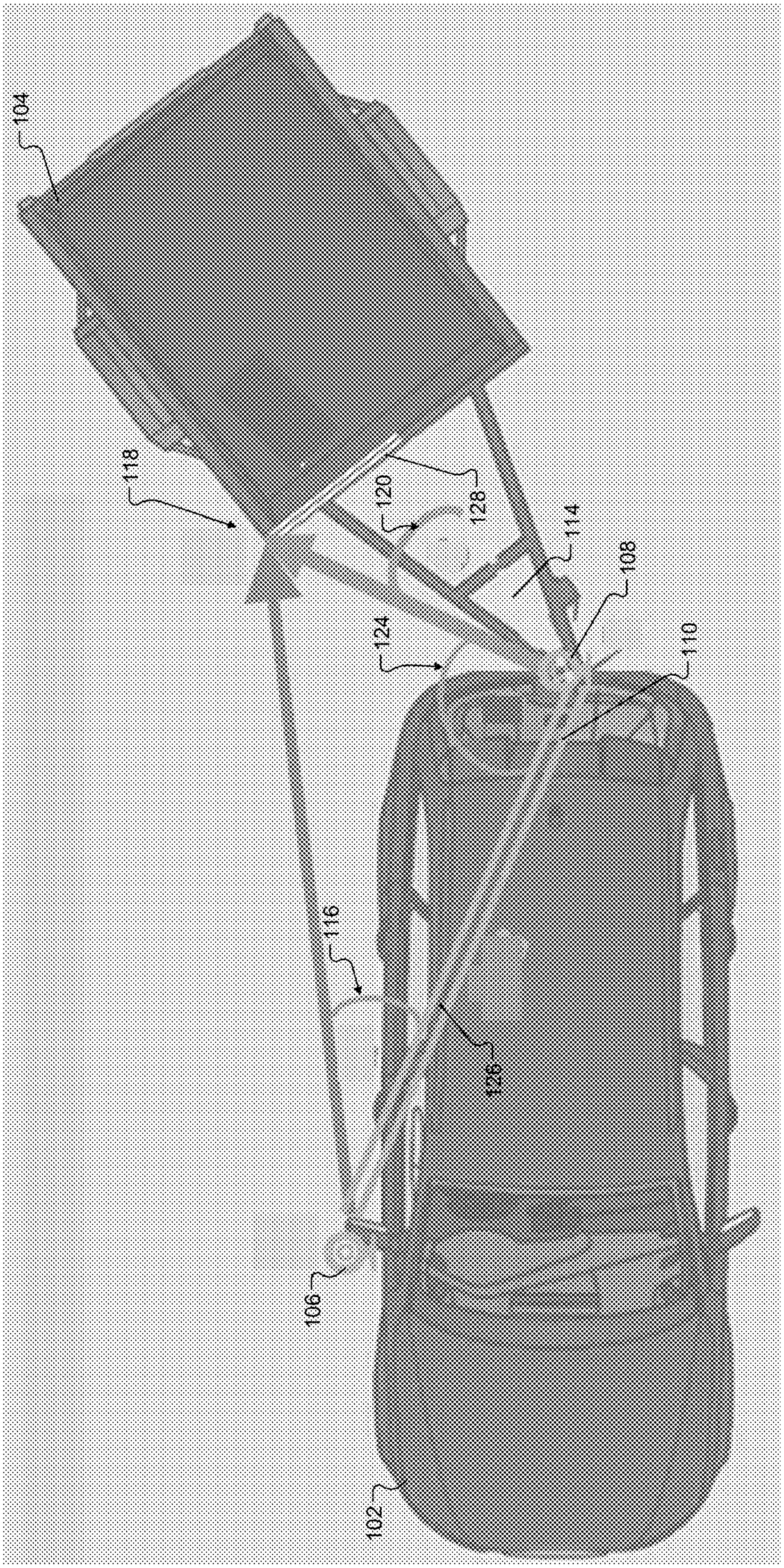
FIG. 3 is an example overhead view of the automated vehicle camera system of FIG. 1 configured to determine a width of the trailer according to the front corner location and a hitch articulation angle.

FIG. 3 is an example overhead view of the automated vehicle camera system of FIG. 1 configured to determine a width of the trailer according to the front corner location and a hitch articulation angle. The vehicle control module may be configured to determine a half-width 128 of the trailer using trigonometry, based on other determined distances and angles of the trailer and vehicle components.

For example, a sine operation on the angle 120 between the front corner 118 and the trailer centerline 114, from the perspective of the trailer hitch 108, may be equal to a distance from the trailer hitch 108 to the front corner 118 divided by the half-width 128. In particular, if the angle 120 is defined as 'c', the location of the trailer hitch is defined as 'B', and the location of the front corner 118 is defined as 'C', and the trailer width is defined as 'W, then sin(c)=B*C/(W/2). The full width of the trailer may then be calculated by doubling the value of the half-width 128. In particular, W=2*B*C/sin(c).

Figure 4:
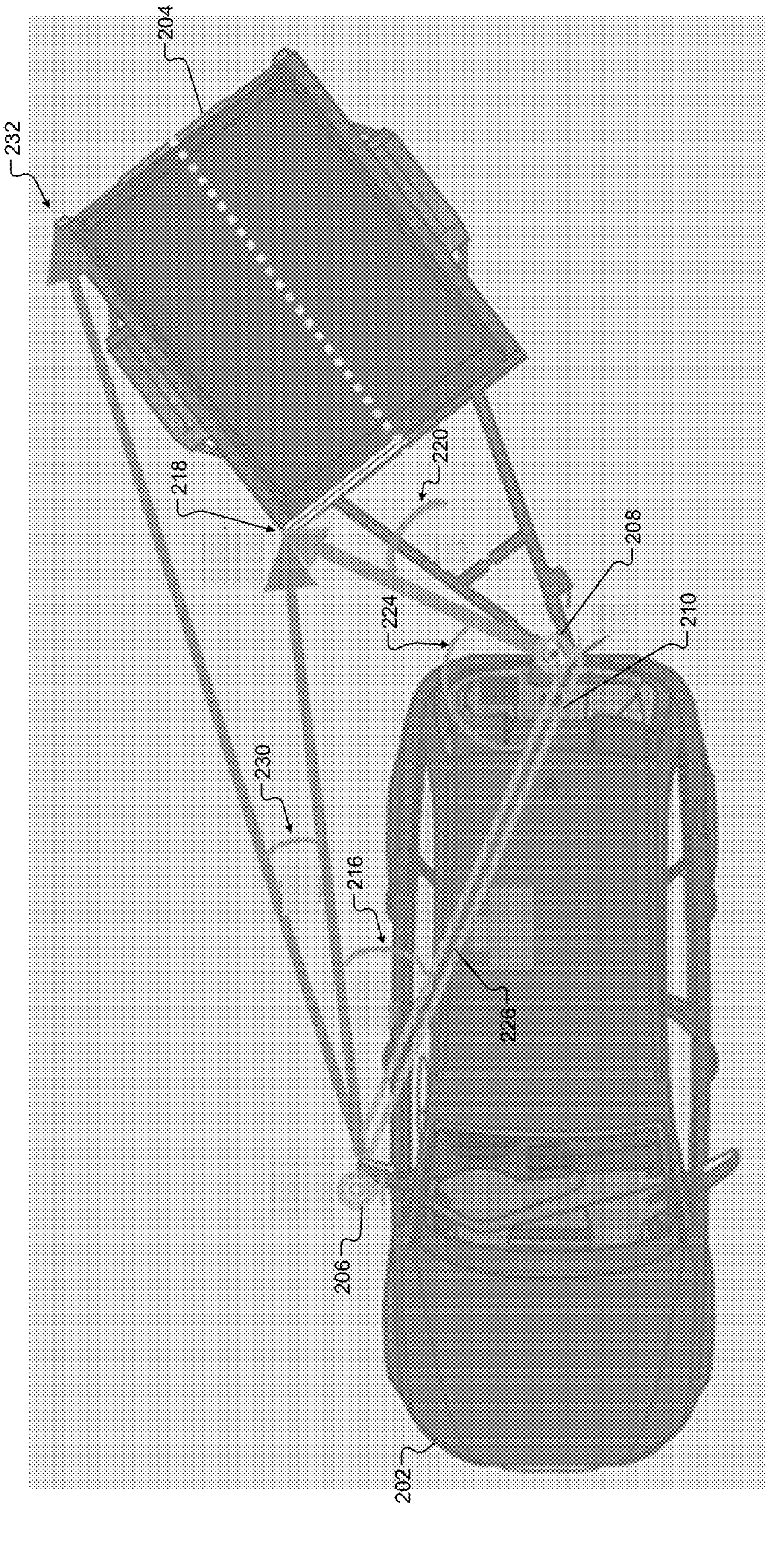
FIG. 4 is an example overhead view of the automated vehicle camera system of FIG. 1 configured to determine a rear corner location of the trailer.

FIG. 4 is an example overhead view of the automated vehicle camera system of FIG. 1 configured to determine a rear corner location of the trailer. As shown in FIG. 4, the vehicle 202 is towing a trailer 204, which is coupled to a trailer hitch 208.

The vehicle 202 includes a side vehicle camera 206, and a rear vehicle camera 210. The side vehicle camera 206 and rear vehicle camera 210 may be located at any suitable positions on the vehicle, such as a side view mirror, a side panel, a rear vehicle door, a rear vehicle panel, a center top location at a rear of the vehicle, an offset rear camera, etc.

The locations of the side vehicle camera 206 and the location of the rear vehicle camera 210 on the vehicle, and relative to one another, may be stored in memory of a vehicle control module. For example, a computer-aided design (CAD) model of the vehicle (or other dimensions) may be stored, indicating a distance 226 between the side vehicle camera 206 and the rear vehicle camera 210 and/or the trailer hitch 208.

The rear vehicle camera 210 and/or side vehicle camera 206 may be configured to determine a location of a front corner 218 of the trailer 204, such as by processing images of the trailer 204 as captured by the rear vehicle camera 210 to identify an edge of the trailer 204 in the image. For example, a forward ray intersection may be calculated based on the distance 226 between the side vehicle camera 206 and the rear vehicle camera 210, the angle 216 between the front corner 218 and trailer hitch 208 from the perspective of side vehicle camera 206, and the angle 224 between the front corner 218 and the side vehicle camera 206 from the perspective of the trailer hitch 208. The vehicle control module may determine an angle 220 between the trailer centerline 214 and the front corner 218 of the trailer 204.

As shown in FIG. 4, the vehicle control module may determine a location of a rear corner 232 of the trailer 204, such as by processing an image captured by the side vehicle camera 206. The vehicle control module may determine an angle 230 between the front corner 218 and the rear corner 232, from the perspective of the side vehicle camera 206.

Figure 5:
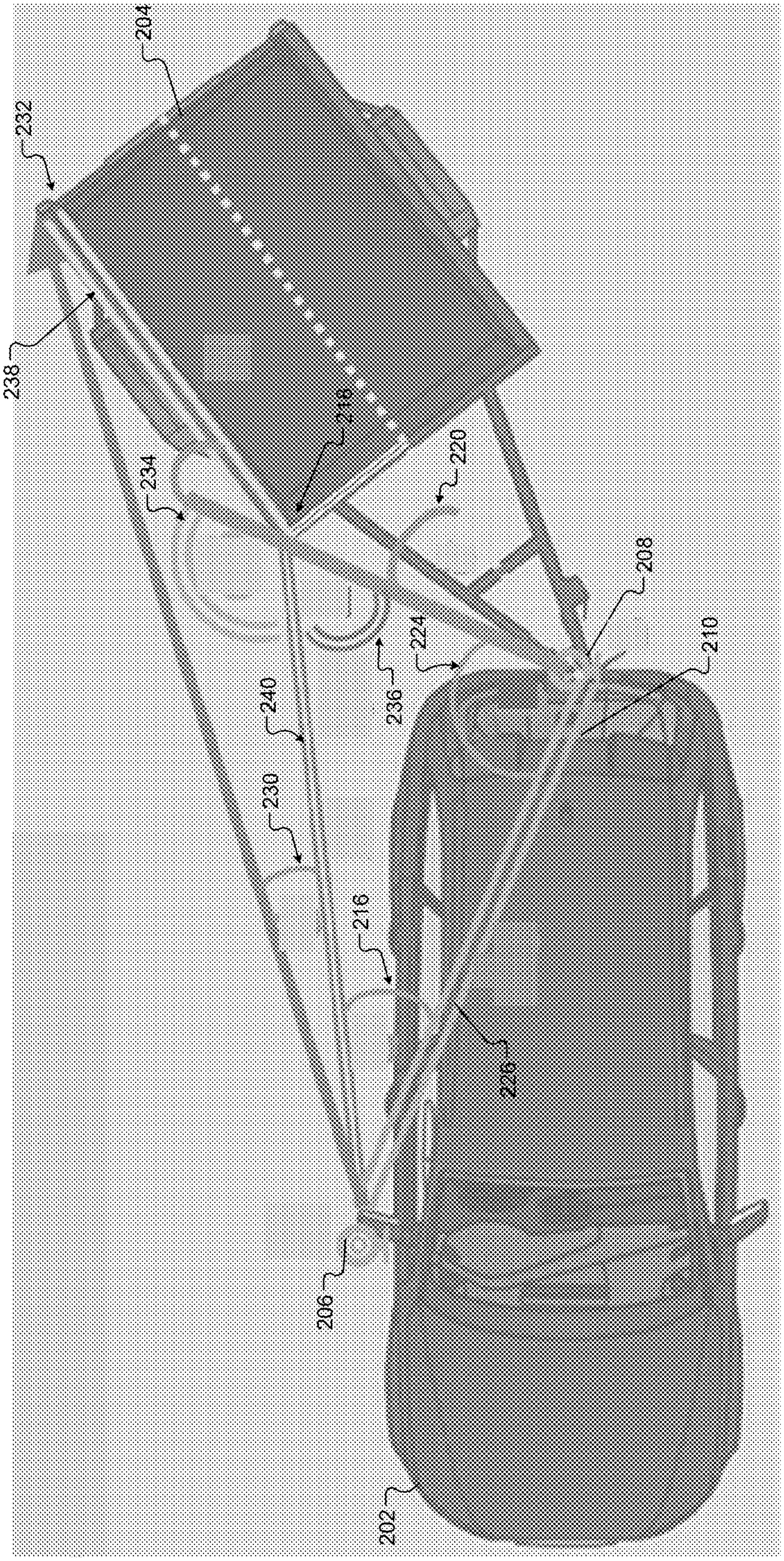
FIG. 5 is an example overhead view of the automated vehicle camera system of FIG. 1 configured to determine a length of the trailer according to the front corner location and a hitch articulation angle.

FIG. 5 is an example overhead view of the automated vehicle camera system of FIG. 1 configured to determine a length of the trailer according to the front corner location and a hitch articulation angle. The vehicle control module may determine an angle 236 between the trailer hitch 208 and the side vehicle camera 206, from the perspective of the front corner 218. The angle 236 may be calculated as 180 degrees minus the values of the angle 224 and the angle 216. The vehicle control module may determine an angle 234 as 180 degrees minus the angle 236.

In some examples, the location of the rear corner 232 may be calculated using a forward ray intersection based on a distance 240 between the side vehicle camera 206 and the front corner 218, the angle 230 between the rear corner 232 and the front corner 218, and the angle 234 plus the angle 220. The length of the trailer 2-4 may then be calculated by subtracting the location of the front corner from the location of the rear corner 232.

In some examples, a precision of the determined trailer width and determined trailer length may be calculated. For example, a sigma operation may be performed on the determined location of the front corner 218, and the angle 220, to estimate a precision of the trailer width calculation. A sigma operation may be performed on the determined location of the front corner 218, and the determined location of the rear corner 232, to estimate a precision of the calculated length of the trailer 204.

Breaking down the sigma operations further, a precision of the location of the front corner 218 may be calculated by performing a sigma operation on the angle 216, the angle 224, and the distance 226 between the side vehicle camera 206 and the trailer hitch 208. A precision of the angle 234 may be estimated by performing a sigma operation on the angle 216, the angle 224, and the angle 220. A precision of the location of the rear corner 232 may be estimated by performing a sigma operation on the angle 230, the angle 234, and the distance 240 between the side vehicle camera 206 and the front corner 218.

Figure 6:
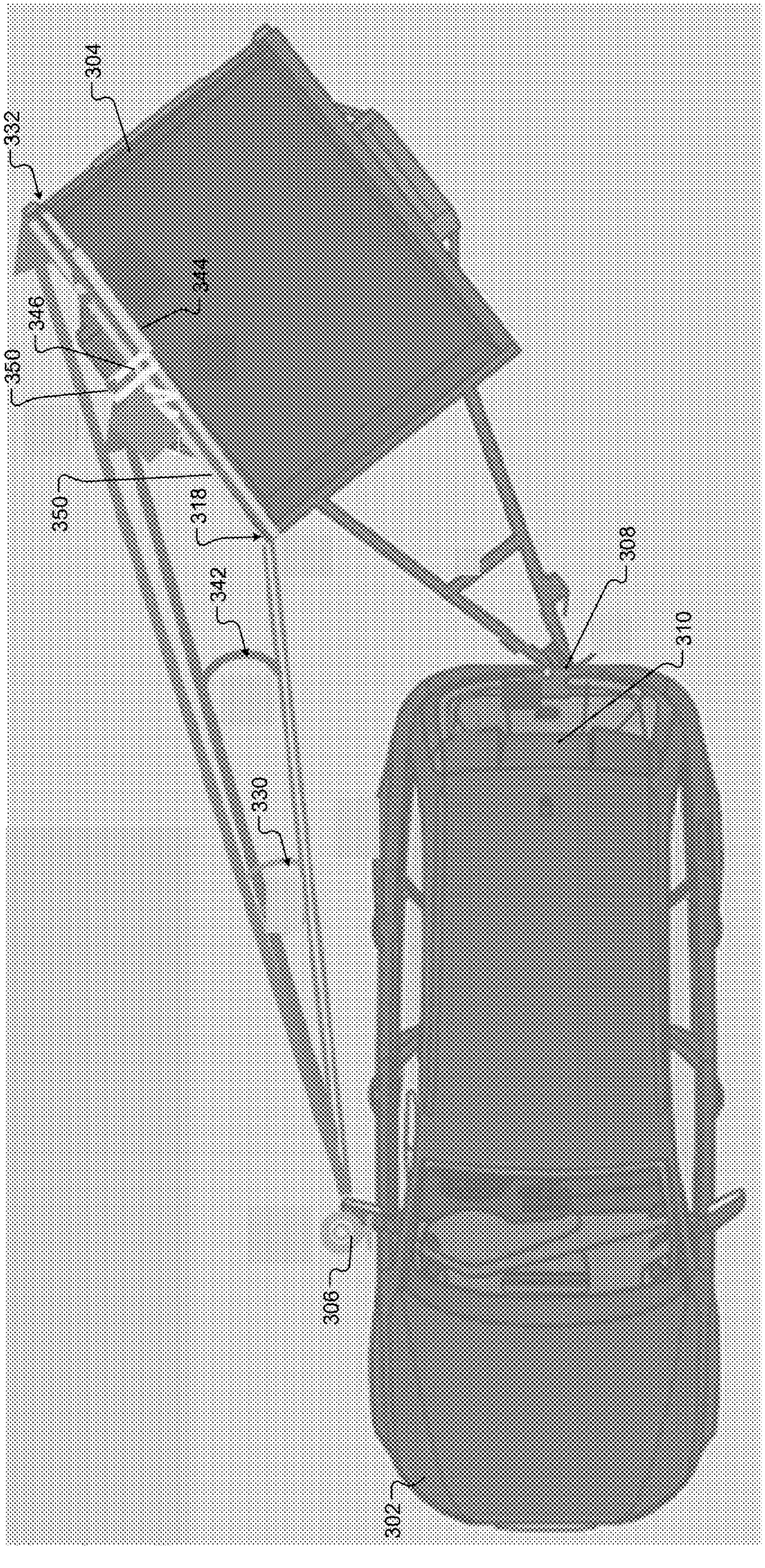
FIG. 6 is an example overhead view of the automated vehicle camera system of FIG. 1 configured to determine an axle length of the trailer based on an identified wheel location of the trailer.

FIG. 6 is an example overhead view of the automated vehicle camera system of FIG. 1 configured to determine an axle length of the trailer based on an identified wheel location of the trailer. As shown in FIG. 6, the vehicle 302 is towing a trailer 304, which is coupled to a trailer hitch 308.

The vehicle 302 includes a side vehicle camera 306, and a rear vehicle camera 310. The side vehicle camera 306 and rear vehicle camera 310 may be located at any suitable positions on the vehicle, such as a side view mirror, a side panel, a rear vehicle door, a rear vehicle panel, a center top location at a rear of the vehicle, an offset rear camera, etc.

The locations of the side vehicle camera 306 and the location of the rear vehicle camera 310 on the vehicle, and relative to one another, may be stored in memory of a vehicle control module. For example, a computer-aided design (CAD) model of the vehicle (or other dimensions) may be stored, indicating a distance between the side vehicle camera 306 and the rear vehicle camera 310 and/or the trailer hitch 308.

The rear vehicle camera 310 and/or side vehicle camera 306 may be configured to determine a location of a front corner 318 of the trailer 304, such as by processing images of the trailer 304 as captured by the rear vehicle camera 310 to identify an edge of the trailer 304 in the image.

As shown in FIG. 4, the vehicle control module may determine a location of a rear corner 332 of the trailer 304, such as by processing an image captured by the side vehicle camera 306. The vehicle control module may determine an angle 330 between the front corner 318 and the rear corner 332, from the perspective of the side vehicle camera 306.

The vehicle control module may determine an angle 342 between a location of a wheel 350 of the trailer 304, and the front corner 318 of the trailer, from the perspective of the side vehicle camera 306. the location of the wheel 350 may be determined by processing an image from the side vehicle camera 306. The angle 342 may be used in combination with the location of the wheel 350, to determine a portion 346 of an axle length of the trailer 304. This may be based on calculating a distance 344 along the length of the trailer 304 between the axle centerline and a projection of a ray from the side vehicle camera 306 through the outside edge of the wheel 350. The full axle length may then be determined based on the calculation of the portion 346 of the axle. A sigma operation may be calculated on the angle 330, the angle 342, the location of the wheel 350, and the length of the axle portion 346, to estimate a precision of the axle length calculation.

Figure 7:
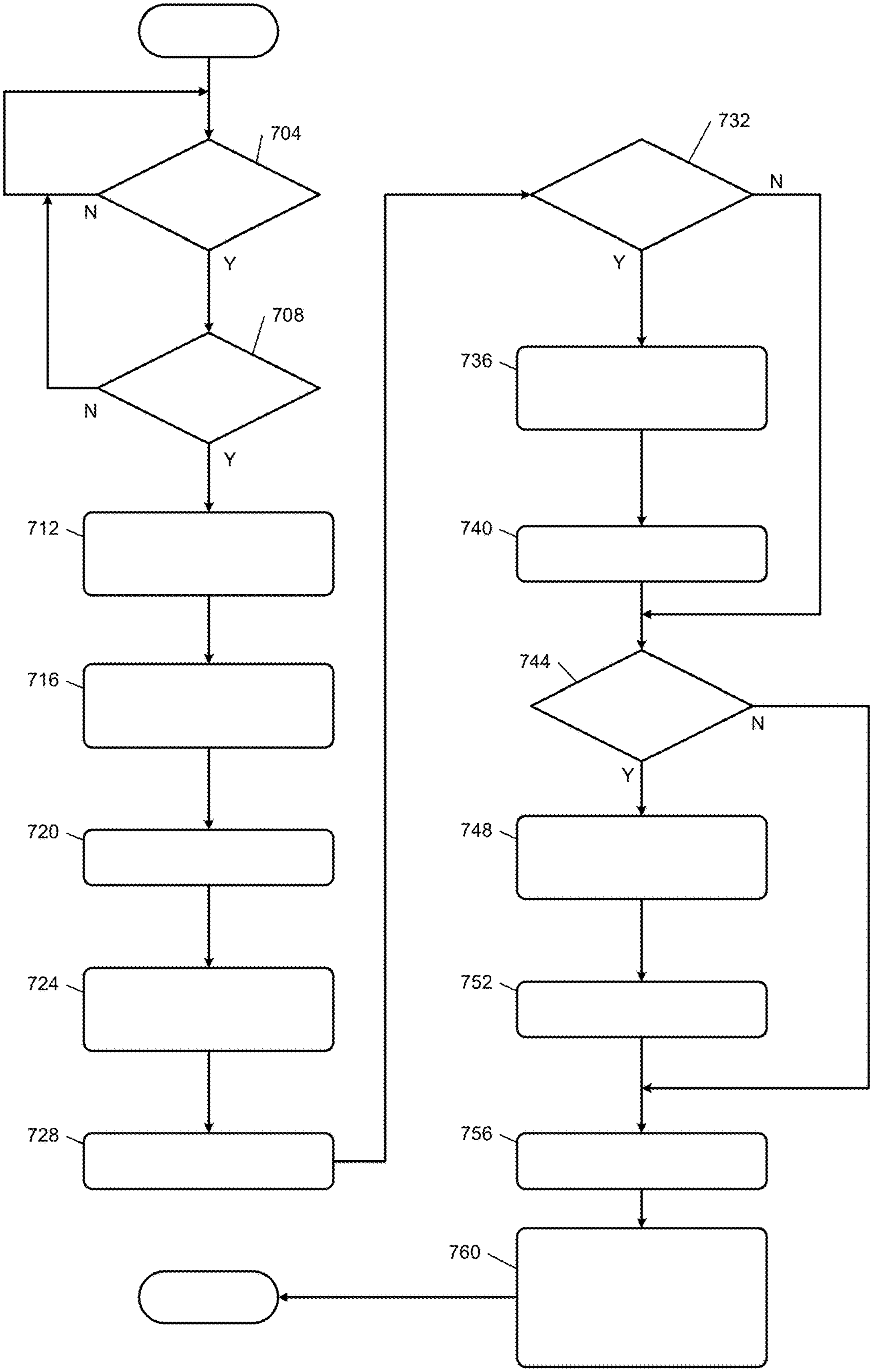
FIG. 7 is a flowchart depicting an example process for automated determination of trailer dimensions using vehicle rear and side cameras, and a hitch articulation angle.

FIG. 7 is a flowchart depicting an example process for automated determination of trailer dimensions using vehicle rear and side cameras, and a hitch articulation angle. The process may be performed by, for example, the vehicle control module 20 of FIG. 1. At 704, the process begins by determining whether the vehicle is currently driving. Some camera systems may work better in capturing images and determining parameters such as hitch articulation angle, while the vehicle is moving.

If the vehicle is driving at 704, control proceeds to 708 to determine whether the hitch articulation angle is greater than a specified hitch articulation angle threshold. The hitch articulation threshold may be a value where the trailer is rotated sufficiently for the vehicle camera(s) to identify a front and/or rear corner of the trailer based on captured images of the trailer. Example hitch articulation angle thresholds may be calibratable (e.g., based on system calibrations, user inputs, etc.), and may include at least fifteen degrees, at least thirty degrees, etc. The hitch articulation threshold may be determined using any suitable approach, such as the rear vehicle camera 26 of FIG. 1 capturing an image of the trailer hitch 30 and/or a trailer coupled to the trailer hitch 30, a dedicated position sensor on or adjacent the trailer hitch 30, etc.

If the hitch articulation angle is greater than the specified threshold at 708, control proceeds to 712 to capture images of the trailer using side vehicle and rear vehicle cameras. Control then measures a trailer front corner based on the capture images, at 716. For example, the side and rear view cameras may capture images of the trailer (such as the side view camera 24 and the rear view camera 26 of FIG. 1), where image processing is performed on the images to detect a location of the front corner of the trailer.

The vehicle control module may then calculate the trailer width at 720, based on the determined location of the trailer front corner, the hitch articulation angle, and locations of the rear and side camera on the vehicle. At 724, the vehicle control module is configured to measure a rear corner of the trailer with a side view camera.

For example, the side view camera 24 may be used to capture an image of a trailer coupled to the trailer hitch 30, with image processing performed to identify a location of the rear corner of the trailer in the image. Control then calculates a trailer length at 728, based on the identified locations of the front and rear corners of the trailer, the hitch articulation angle, and the known locations of the side and rear cameras on the vehicle.

At 732, control determines whether a box can be fit to the trailer (e.g., whether the trailer has a rectangular profile). This may be determined via user input, image processing of image captured by the rear and side cameras, etc. If a box can be fit, control proceeds to 736 to measure a trailer top corner, using the vehicle side camera and/or vehicle rear camera. Control then calculates a trailer height at 740, based on one or more of the identified top corner of the trailer, the hitch articulation angle, the identified front corner of the trailer, and known locations of the rear and side cameras on the vehicle.

At 744, the vehicle control module is configured to determine whether trailer wheels are visible. For example, an image captured by the side vehicle camera 24 may be processed to determine whether a wheel of the trailer (or a wheel hub) is visible in the image. If so, control proceeds to 748 to measure a trailer distance to the wheel center using the side view camera. Control then calculates a trailer axle length at 752, using one or more of the identified wheel location or wheel center, a determined length and/or width of the trailer, identified front and/or rear corners of the trailer, a determined hitch articulation angle, and known locations of the rear vehicle camera and side vehicle camera.

At 756, the vehicle control module is configured to set trailer dimensions in a memory of the vehicle control module. These dimensions may include trailer width, length, height and/or axle length, as determined using example approaches described herein. At 760, the vehicle control module is configured to automatically control acceleration, braking and/or steering of the vehicle based on the determined trailer dimensions. For example, the vehicle control module may adjust lane crossing warnings and/or automated lane following steering based on a determined width of the trailer, may adjust reversing distances and braking based on a determined length of the trailer, may adjust reversing steering based on sensitivity of trailer rotation according to the determined axle length, may select navigation routes based on known bridge clearances and the determined trailer height, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle camera system for a vehicle trailer, the vehicle camera system comprising:
- a trailer hitch configured to couple with a trailer for towing the trailer behind a vehicle;
- a rear vehicle camera configured to capture images of the trailer from a rear of the vehicle;
- a side vehicle camera configured to capture images of the trailer from a side of the vehicle; and
- a vehicle control module configured to:
  - capture a rearview image of the trailer from the rear vehicle camera;
  - capture a sideview image of the trailer from the side vehicle camera;
  - obtain stored camera dimensions of the vehicle indicative of a location of the rear vehicle camera relative to a location of the side vehicle camera;
  - determine a hitch articulation angle of the trailer hitch according to the rearview image captured by the rear vehicle camera;
  - identify a front corner location of the trailer according to the rearview image and the sideview image;
  - calculate a width of the trailer according to the front corner location, the hitch articulation angle, and the stored camera dimensions;
  - store the width of the trailer in memory for automated control of the vehicle while the trailer is attached to the trailer hitch;
  - identify a wheel location of the trailer according to the sideview image captured by the side vehicle camera;
  - calculate an axle length of the trailer according to the wheel location, the front corner location, the hitch articulation angle and the stored camera dimensions; and
  - store the axle length of the trailer in memory for automated control of the vehicle while the trailer is attached to the trailer hitch.

2. The vehicle camera system of claim 1, wherein the vehicle control module is configured to control automated steering of the vehicle, automated acceleration of the vehicle, and automated braking of the vehicle, according to the width of the trailer stored in memory.

3. The vehicle camera system of claim 2, wherein the vehicle control module is configured to modify automated trailer reversing control of the vehicle according to the width of the trailer stored in memory.

4. The vehicle camera system of claim 1, wherein the vehicle control module is configured to:

identify a rear corner location of the trailer according to the sideview image captured by the side vehicle camera;

calculate a length of the trailer according to the rear corner location, the front corner location, the hitch articulation angle and the stored camera dimensions; and store the length of the trailer in memory for automated control of the vehicle while the trailer is attached to the trailer hitch.

5. The vehicle camera system of claim 1, wherein the vehicle control module is configured to:

identify a top corner location of the trailer according to the sideview image captured by the side vehicle camera;

calculate a height of the trailer according to the top corner location, the front corner location, the hitch articulation angle and the stored camera dimensions; and store the height of the trailer in memory for automated control of the vehicle while the trailer is attached to the trailer hitch.

6. The vehicle camera system of claim 5, wherein the vehicle control module is configured to:

determine whether the trailer has a rectangular profile according to at least one of the sideview image and the rearview image;

calculate the height of the trailer in response to determining that the trailer has the rectangular profile; and generate a notification of ineligible height calculation in response to determining that the trailer does not have the rectangular profile.

7. The vehicle camera system of claim 1, wherein the vehicle control module is configured to:

determine whether a wheel of the trailer is visible in the sideview image;

calculate the axle length of the trailer only in response to determining that the wheel is visible in the sideview image; and generate a notification of ineligible axle length calculation in response to determining that the wheel is not visible in the sideview image.

8. The vehicle camera system of claim 1, wherein the stored camera dimensions include a computer-aided design (CAD) model of the vehicle including locations of the rear vehicle camera and the side vehicle camera.

9. The vehicle camera system of claim 1, wherein the vehicle control module is configured to:

obtain a specified articulation angle threshold;

calculate the width of the trailer only in response to the hitch articulation angle of the trailer being greater than the specified articulation angle threshold; and generate a notification of ineligible width calculation in response to the hitch articulation angle of the trailer being less than the specified articulation angle threshold.

10. The vehicle camera system of claim 9, wherein the specified articulation angle threshold is a calibratable threshold of at least thirty degrees.

11. The vehicle camera system of claim 1, wherein the vehicle control module is configured to calculate the width of the trailer without using any sensed ultrasonic data indicative of a location of the trailer.

12. A method of operating a vehicle camera system for a vehicle trailer, the method comprising:

capturing a rearview image of a trailer from a rear vehicle camera, the trailer coupled with a trailer hitch of a vehicle;

capturing a sideview image of the trailer from a side vehicle camera;

obtaining stored camera dimensions of the vehicle indicative of a location of the rear vehicle camera relative to a location of the side vehicle camera;

determining a hitch articulation angle of the trailer hitch according to the rearview image captured by the rear vehicle camera;

identifying a front corner location of the trailer according to the rearview image and the sideview image;

obtaining a specified articulation angle threshold;

in response to the hitch articulation angle of the trailer being greater than the specified articulation angle threshold, calculating a width of the trailer according to the front corner location, the hitch articulation angle, and the stored camera dimensions, and storing the width of the trailer in memory for automated control of the vehicle while the trailer is attached to the trailer hitch; and generating a notification of ineligible width calculation in response to the hitch articulation angle of the trailer being less than the specified articulation angle threshold.

13. The method of claim 12, further comprising controlling automated steering of the vehicle, automated acceleration of the vehicle, and automated braking of the vehicle, according to the width of the trailer stored in memory.

14. The method of claim 13, further comprising modifying automated trailer reversing control of the vehicle according to the width of the trailer stored in memory.

15. The method of claim 12, further comprising:

identifying a rear corner location of the trailer according to the sideview image captured by the side vehicle camera;

calculating a length of the trailer according to the rear corner location, the front corner location, the hitch articulation angle and the stored camera dimensions; and storing the length of the trailer in memory for automated control of the vehicle while the trailer is attached to the trailer hitch.

16. The method of claim 12, further comprising:

identifying a top corner location of the trailer according to the sideview image captured by the side vehicle camera;

calculating a height of the trailer according to the top corner location, the front corner location, the hitch articulation angle and the stored camera dimensions; and storing the height of the trailer in memory for automated control of the vehicle while the trailer is attached to the trailer hitch.

17. The method of claim 16, further comprising:

determining whether the trailer has a rectangular profile according to at least one of the sideview image and the rearview image;

calculating the height of the trailer only in response to determining that the trailer has the rectangular profile; and generating a notification of ineligible height calculation in response to determining that the trailer does not have the rectangular profile.

18. The method of claim 12, further comprising:

identifying a wheel location of the trailer according to the sideview image captured by the side vehicle camera;

calculating an axle length of the trailer according to the wheel location, the front corner location, the hitch articulation angle and the stored camera dimensions; and storing the axle length of the trailer in memory for automated control of the vehicle while the trailer is attached to the trailer hitch.

19. A method of operating a vehicle camera system for a vehicle trailer, the method comprising:

capturing a rearview image of a trailer from a rear vehicle camera, the trailer coupled with a trailer hitch of a vehicle;

capturing a sideview image of the trailer from a side vehicle camera;

obtaining stored camera dimensions of the vehicle indicative of a location of the rear vehicle camera relative to a location of the side vehicle camera;

determining a hitch articulation angle of the trailer hitch according to a hitch articulation sensor rearview image captured by the rear vehicle camera;

identifying a front corner location of the trailer according to the rearview image and the sideview image;

identifying a rear corner location of the trailer according to the sideview image;

calculating a length of the trailer according to the front corner location, the rear corner location, the hitch articulation angle, and the stored camera dimensions;

storing the length of the trailer in memory for automated control of the vehicle while the trailer is attached to the trailer hitch;

identifying a top corner location of the trailer according to the sideview image captured by the side vehicle camera;

determining whether the trailer has a rectangular profile according to at least one of the sideview image and the rearview image;

in response to determining that the trailer has the rectangular profile, calculating a height of the trailer according to the top corner location, the front corner location, the hitch articulation angle and the stored camera dimensions, and storing the height of the trailer in memory for automated control of the vehicle while the trailer is attached to the trailer hitch; and generating a notification of ineligible height calculation in response to determining that the trailer does not have the rectangular profile.

20. The method of claim 19, further comprising controlling automated steering of the vehicle, automated acceleration of the vehicle, and automated braking of the vehicle, according to the length of the trailer stored in memory.

* * * * *